United States Patent
Gooding

(10) Patent No.: US 7,930,595 B2
(45) Date of Patent: Apr. 19, 2011

(54) METHOD AND APPARATUS FOR ANALYZING ERROR CONDITIONS IN A MASSIVELY PARALLEL COMPUTER SYSTEM BY IDENTIFYING ANOMALOUS NODES WITHIN A COMMUNICATOR SET

(75) Inventor: Thomas Michael Gooding, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 889 days.

(21) Appl. No.: 11/425,773

(22) Filed: Jun. 22, 2006

(65) Prior Publication Data

US 2008/0022261 A1   Jan. 24, 2008

(51) Int. Cl.
    *G06F 11/00* (2006.01)
(52) U.S. Cl. ........................................... 714/37
(58) Field of Classification Search .................. 714/10, 714/37
    See application file for complete search history.

(56) References Cited

U.S. PATENT DOCUMENTS

| | | | | |
|---|---|---|---|---|
| 5,371,883 | A  * | 12/1994 | Gross et al. | 714/38 |
| 5,748,872 | A  * | 5/1998 | Norman | 714/11 |
| 5,819,094 | A  * | 10/1998 | Sato et al. | 717/131 |
| 5,970,248 | A  * | 10/1999 | Meier | 717/125 |
| 7,472,039 | B2 * | 12/2008 | Yamamura et al. | 702/186 |
| 2002/0144019 | A1 * | 10/2002 | Gooding | 709/330 |
| 2002/0178416 | A1 * | 11/2002 | Chen et al. | 714/733 |
| 2003/0217087 | A1 * | 11/2003 | Chase et al. | 709/1 |
| 2007/0294671 | A1 * | 12/2007 | Demetriou et al. | 717/124 |

* cited by examiner

*Primary Examiner* — Scott T Baderman
*Assistant Examiner* — Yair Leibovich
(74) *Attorney, Agent, or Firm* — Roy W. Truelson

(57) ABSTRACT

An analytical mechanism for a massively parallel computer system automatically analyzes data retrieved from the system, and identifies nodes which exhibit anomalous behavior in comparison to their immediate neighbors. Preferably, anomalous behavior is determined by comparing call-return stack tracebacks for each node, grouping like nodes together, and identifying neighboring nodes which do not themselves belong to the group. A node, not itself in the group, having a large number of neighbors in the group, is a likely locality of error. The analyzer preferably presents this information to the user by sorting the neighbors according to number of adjoining members of the group.

17 Claims, 7 Drawing Sheets

| Node | N_Cnt | Set_Memb | Node | N_Cnt | Set_Memb |
|---|---|---|---|---|---|
| (3,4) | 4 | No | (1,2) | 1 | No |
| (4,3) | 4 | Yes | (1,3) | 1 | No |
| (2,3) | 3 | Yes | (1,4) | 1 | No |
| (3,2) | 3 | Yes | (1,5) | 1 | No |
| (3,3) | 3 | Yes | (2,1) | 1 | No |
| (4,2) | 3 | Yes | (2,6) | 1 | No |
| (4,4) | 3 | Yes | (3,1) | 1 | No |
| (4,5) | 3 | Yes | (3,6) | 1 | No |
| (5,3) | 3 | Yes | (4,1) | 1 | No |
| (5,4) | 3 | Yes | (4,6) | 1 | No |
| (2,2) | 2 | Yes | (5,1) | 1 | No |
| (2,4) | 2 | Yes | (5,6) | 1 | No |
| (2,5) | 2 | Yes | (6,2) | 1 | No |
| (3,5) | 2 | Yes | (6,3) | 1 | No |
| (5,2) | 2 | Yes | (6,4) | 1 | No |
| (5,5) | 2 | Yes | (6,5) | 1 | No |

METHOD AND APPARATUS FOR ANALYZING ERROR CONDITIONS IN A MASSIVELY PARALLEL COMPUTER SYSTEM BY IDENTIFYING ANOMALOUS NODES WITHIN A COMMUNICATOR SET

STATEMENT REGARDING FEDERALLY SPONSORED RESEARCH OR DEVELOPMENT

This invention was made with Government support under Contract No. B591700 awarded by the Department of Energy. The Government has certain rights in this invention.

FIELD OF THE INVENTION

The present invention relates to digital data processing, and in particular to the operation of massively parallel computer systems comprising multiple nodes arranged in a regular matrix.

BACKGROUND OF THE INVENTION

In the latter half of the twentieth century, there began a phenomenon known as the information revolution. While the information revolution is a historical development broader in scope than any one event or machine, no single device has come to represent the information revolution more than the digital electronic computer. The development of computer systems has surely been a revolution. Each year, computer systems grow faster, store more data, and provide more applications to their users.

A modern computer system typically comprises one or more central processing units (CPU) and supporting hardware necessary to store, retrieve and transfer information, such as communication buses and memory. It also includes hardware necessary to communicate with the outside world, such as input/output controllers or storage controllers, and devices attached thereto such as keyboards, monitors, tape drives, disk drives, communication lines coupled to a network, etc. The CPU or CPUs are the heart of the system. They execute the instructions which comprise a computer program and directs the operation of the other system components.

From the standpoint of the computer's hardware, most systems operate in fundamentally the same manner. Processors are capable of performing a limited set of very simple operations, such as arithmetic, logical comparisons, and movement of data from one location to another. But each operation is performed very quickly. Sophisticated software at multiple levels directs a computer to perform massive numbers of these simple operations, enabling the computer to perform complex tasks. What is perceived by the user as a new or improved capability of a computer system is made possible by performing essentially the same set of very simple operations, but doing it much faster, and thereby enabling the use of software having enhanced function. Therefore continuing improvements to computer systems require that these systems be made ever faster.

The overall speed of a computer system (also called the throughput) may be crudely measured as the number of operations performed per unit of time. Conceptually, the simplest of all possible improvements to system speed is to increase the clock speeds of the various components, and particularly the clock speed of the processor(s). E.g., if everything runs twice as fast but otherwise works in exactly the same manner, the system will perform a given task in half the time. Enormous improvements in clock speed have been made possible by reduction in component size and integrated circuitry, to the point where an entire processor, and in some cases multiple processors along with auxiliary structures such as cache memories, can be implemented on a single integrated circuit chip. Despite these improvements in speed, the demand for ever faster computer systems has continued, a demand which can not be met solely by further reduction in component size and consequent increases in clock speed. Attention has therefore been directed to other approaches for further improvements in throughput of the computer system.

Without changing the clock speed, it is possible to improve system throughput by using multiple processors. The modest cost of individual processors packaged on integrated circuit chips has made this approach practical. Although the use of multiple processors creates additional complexity by introducing numerous architectural issues involving data coherency, conflicts for scarce resources, and so forth, it does provide the extra processing power needed to increase system throughput.

Various types of multi-processor systems exist, but one such type of system is a massively parallel nodal system for computationally intensive applications. Such a system typically contains a large number of processing nodes, each node having its own processor or processors and local (nodal) memory, where the nodes are arranged in a regular matrix or lattice structure. The system contains a mechanism for communicating data among different nodes, a control mechanism for controlling the operation of the nodes, and an I/O mechanism for loading data into the nodes from one or more I/O devices and receiving output from the nodes to the I/O device(s). In general, each node acts as an independent computer system in that the addressable memory used by the processor is contained entirely within the processor's local node, and the processor has no capability to directly reference data addresses in other nodes. However, the control mechanism and I/O mechanism are shared by all the nodes.

A massively parallel nodal system such as described above is a general-purpose computer system in the sense that it is capable of executing general-purpose applications, but it is designed for optimum efficiency when executing computationally intensive applications, i.e., applications in which the proportion of computational processing relative to I/O processing is high. In such an application environment, each processing node can independently perform its own computationally intensive processing with minimal interference from the other nodes. In order to support computationally intensive processing applications which are processed by multiple nodes in cooperation, some form of inter-nodal data communication matrix is provided. This data communication matrix supports selective data communication paths in a manner likely to be useful for processing large processing applications in parallel, without providing a direct connection between any two arbitrary nodes. Optimally, I/O workload is relatively small, because the limited I/O resources would otherwise become a bottleneck to performance.

An exemplary massively parallel nodal system is the IBM Blue Gene™ system. The IBM Blue Gene system contains many processing nodes, each having multiple processors and a common local (nodal) memory. The processing nodes are arranged in a logical three-dimensional torus network having point-to-point data communication links between each node and its immediate neighbors in the network. Additionally, each node can be configured to operate either as a single node or multiple virtual nodes (one for each processor within the node), thus providing a fourth dimension of the logical network. A large processing application typically creates one ore more blocks of nodes, herein referred to as communicator sets, for performing specific sub-tasks during execution. The application may have an arbitrary number of such communicator sets, which may be created or dissolved at multiple points during application execution. The nodes of a communicator set typically comprise a rectangular parallelopiped of the three-dimensional torus network.

Identifying and determining the cause of errors in a massively parallel computer system, either as a result of hardware faults or software bugs, is often challenging. Applications designed for massively parallel systems are often complex, and intended to be executed by many processors working and cooperating in parallel. If any of the nodes causes an error, the results produced may be erroneous. An error originally occurring in one processing node may be propagated to other nodes, subject to further data processing, and it may be some time downstream before the error is detected. The sheer number of nodes in a communicator set assigned to a particular application, which may be in the thousands, can make error identification enormously difficult.

Various tools exist to assist a developer or other user in identifying errors and determining their causes, but a need exists for improved tools providing additional capability, not yet foreseen, for debugging errors in a massively parallel computer system. In particular, a need exists for improved tools or methods for isolating particular nodes or localities of a communicator set as likely sources of error.

SUMMARY OF THE INVENTION

An analytical mechanism for a massively parallel computer system automatically analyzes data retrieved from the system, and identifies nodes which exhibit anomalous behavior in comparison to their immediate neighbors. This information is presented to a user as a likely source of error or vicinity of a source of error or other condition of interest.

In the preferred embodiment, anomalous behavior is determined by retrieving a respective call-return stack traceback for each of a plurality of nodes, which may be all the nodes in the system or some user-defined subset of nodes. The nodes are then grouped according to the stack traceback data, i.e., nodes having like stack tracebacks are grouped together. However, other means could alternatively be used for identifying a common behavior. For each such group, a respective set of neighboring nodes is identified, the set of neighboring nodes consisting of all nodes which are neighbors to at least one node of the group, but which are not themselves members of the group. If the group has a regular boundary, it is normally expected that each member of the set of neighboring nodes adjoins a small number (usually one) member of the group. If a member of the set of neighboring nodes adjoins a relatively large number of the group, that neighbor is embedded within the group, and is a likely source of error or vicinity of a source of error or other condition of interest. The analytical mechanism preferably presents this information to the user by sorting the neighbors according to number of adjoining members of the group, so that those neighbors having a relatively large (suspicious) number of adjoining members of the group are presented in an emphasized form, although results of the analysis could be presented in any of various alternative ways.

By automatically identifying nodes which exhibit anomalous behavior in comparison to their immediate neighbors, and particularly nodes which appear to be "holes" in a group of nodes having a regular boundary within the node matrix, an analyzer can rapidly provide useful information localizing the likely source of an error or other condition of interest. Identifying this source manually from a large number of nodes could be very time consuming.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
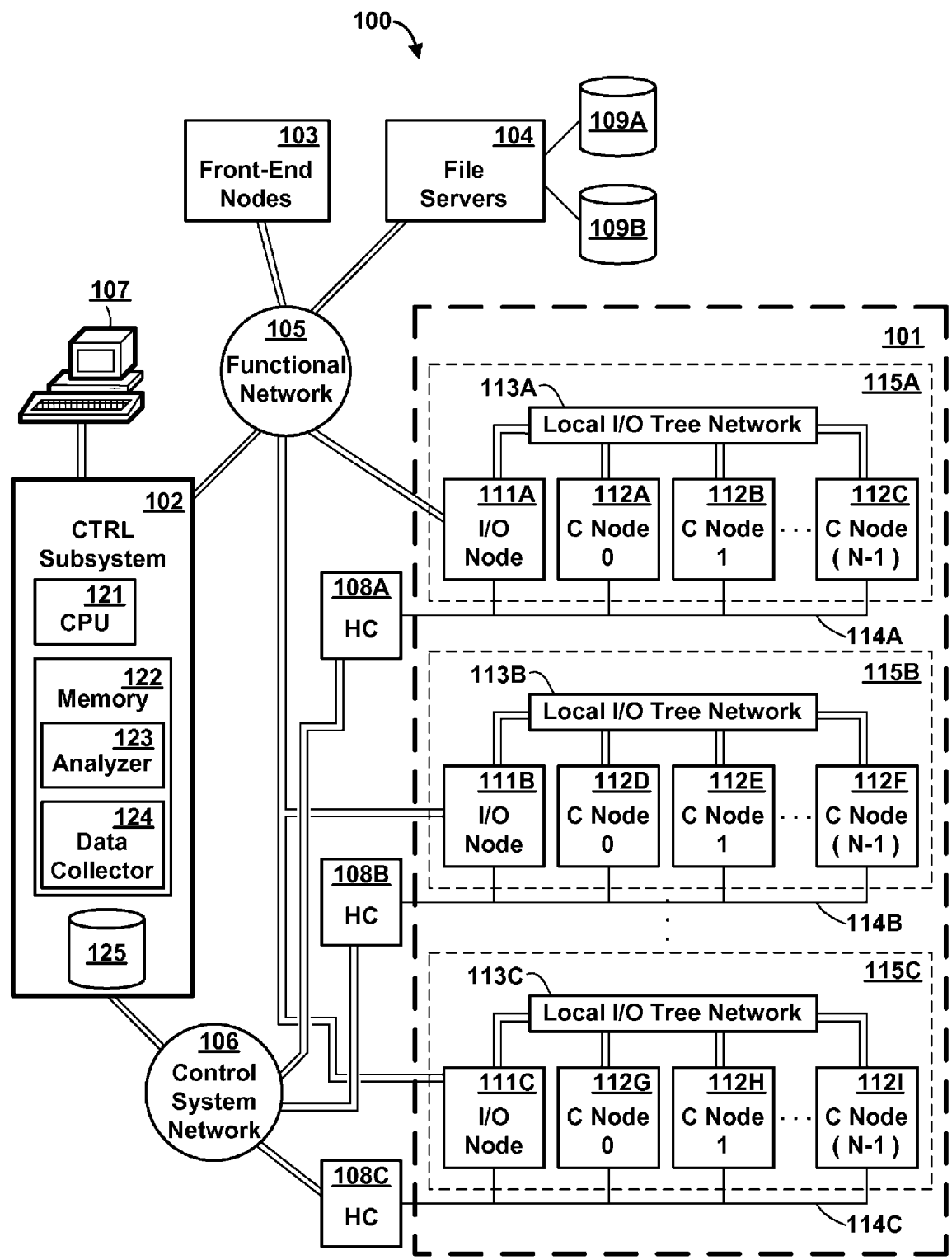
FIG. 1 is a high-level block diagram of the major components of a massively parallel computer system, in accordance with the preferred embodiment of the present invention.

Referring to the Drawing, wherein like numbers denote like parts throughout the several views, FIG. 1 is a high-level block diagram of the major hardware components of a massively parallel computer system 100 in accordance with the preferred embodiment of the present invention. In the preferred embodiment, computer system 100 is an IBM Blue Gene™ computer system, it being understood that other computer systems could be used, and the description of a preferred embodiment herein is not intended to limit the present invention to the particular architecture described. Additional background information concerning the architecture of an IBM Blue Gene™ computer system can be found in commonly assigned copending U.S. patent application Ser. No. 11/316,247 by Bryant et al., entitled "Method and Apparatus for Improving Block Allocation Times in a Computer System", which is herein incorporated by reference.

Computer system 100 comprises a compute core 101 having a large number of compute nodes arranged in a regular array or matrix, which collectively perform the bulk of the useful work performed by system 100. The operation of computer system 100 including compute core 101 is generally controlled by control subsystem 102. Various additional processors contained in front-end nodes 103 perform certain auxiliary data processing functions, and file servers 104 provide an interface to data storage devices such as rotating magnetic disk drives 109A, 109B or other I/O (not shown). Functional network 105 provides the primary data communications path among the compute core 101 and other system components. For example, data stored in storage devices attached to file servers 104 is loaded and stored to other system components through functional network 105.

Compute core 101 comprises I/O nodes 111A-C (herein generically referred to as feature 111) and compute nodes 112A-I (herein generically referred to as feature 112). Compute nodes 112 are the workhorse of the massively parallel system 100, and are intended for executing compute-intensive applications which may require a large number of processes proceeding in parallel. I/O nodes 111 handle I/O operations on behalf of the compute nodes. Each I/O node contains an I/O processor and I/O interface hardware for handling I/O operations for a respective set of N compute nodes 112, the I/O node and its respective set of N compute nodes being referred to as a Pset. Compute core 101 contains M Psets 115A-C (herein generically referred to as feature 115), each containing a single I/O node 111 and N compute nodes 112, for a total of M×N compute nodes 112. The product M×N can be very large. For example, in one implementation M=1024 (1K) and N=64, for a total of 64K compute nodes.

In general, application programming code and other data input required by the compute core for executing user application processes, as well as data output produced by the compute core as a result of executing user application processes, is communicated externally of the compute core over functional network 105. The compute nodes within a Pset 115 communicate with the corresponding I/O node over a corresponding local I/O tree network 113A-C (herein generically referred to as feature 113). The I/O nodes in turn are attached to functional network 105, over which they communicate with I/O devices attached to file servers 104, or with other system components. Thus, the local I/O tree networks 113 may be viewed logically as extensions of functional network 105, and like functional network 105 are used for data I/O, although they are physically separated from functional network 105.

Control subsystem 102 directs the operation of the compute nodes 112 in compute core 101. Control subsystem 102 is preferably a mini-computer system including its own processor or processors 121 (of which one is shown in FIG. 1), internal memory 122, and local storage 125, and having an attached console 107 for interfacing with a system administrator or similar person. Control subsystem 102 includes an internal database which maintains certain state information for the compute nodes in core 101, and a control application executing on the control subsystem's processor(s) which controls the allocation of hardware in compute core 101, directs the pre-loading of data to the compute nodes, and performs certain diagnostic and maintenance functions. Control subsystem preferably includes an analytical program 123 for analyzing errors and a data collection utility 124 for collecting state data from the compute core 101, which execute on processor 121, the operation of which are described in greater detail herein. Control system communicates control and state information with the nodes of compute core 101 over control system network 106. Network 106 is coupled to a set of hardware controllers 108A-C (herein generically referred to as feature 108). Each hardware controller communicates with the nodes of a respective Pset 115 over a corresponding local hardware control network 114A-C (herein generically referred to as feature 114). The hardware controllers 108 and local hardware control networks 114 may be considered logically as extensions of control system network 106, although they are physically separate. The control system network and local hardware control network operates at a lower data rate than the functional network 105.

In addition to control subsystem 102, front-end nodes 103 comprise a collection of processors and memory which perform certain auxiliary functions which, for reasons of efficiency or otherwise, are best performed outside the compute core. Functions which involve substantial I/O operations are generally performed in the front-end nodes. For example, interactive data input, application code editing, or other user interface functions are generally handled by front-end nodes 103, as is application code compilation. Front-end nodes 103 are coupled to functional network 105 for communication with file servers 104, and may include or be coupled to interactive workstations (not shown).

Figure 2:
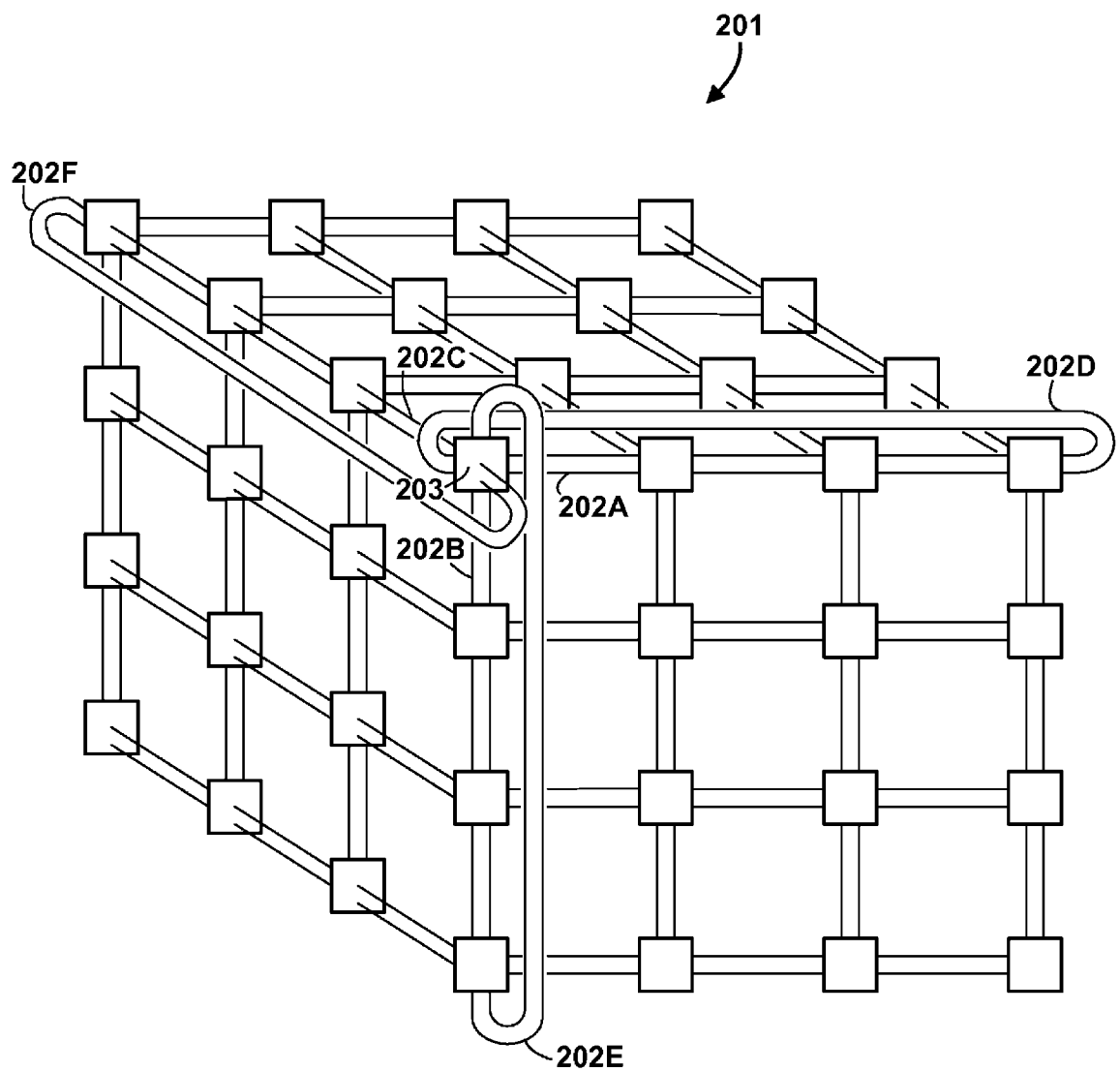
FIG. 2 is a simplified representation of a three dimensional lattice structure and inter-nodal communication network of the system of FIG. 1, according to the preferred embodiment.

Compute nodes 112 are logically arranged in a three-dimensional lattice, each compute node having a respective x, y and z coordinate. FIG. 2 is a simplified representation of the three dimensional lattice structure 201. Referring to FIG. 2, a simplified 4×4×4 lattice is shown, in which the interior nodes of the lattice are omitted for clarity of illustration. Although a 4×4×4 lattice (having 64 nodes) is represented in the simplified illustration of FIG. 2, it will be understood that the actual number of compute nodes in the lattice is typically much larger. Each compute node in lattice 201 contains a set of six node-to-node communication links 202A-F (herein referred to generically as feature 202) for communicating data with its six immediate neighbors in the x, y and z coordinate dimensions.

As used herein, the term "lattice" includes any regular pattern of nodes and inter-nodal data communications paths in more than one dimension, such that each node has a respective defined set of neighbors, and such that, for any given node, it is possible to algorithmically determine the set of neighbors of the given node from the known lattice structure and the location of the given node in the lattice. A "neighbor" of a given node is any node which is linked to the given node by a direct inter-nodal data communications path, i.e. a path which does not have to traverse another node. A "lattice" may be three-dimensional, as shown in FIG. 2, or may have more or fewer dimensions. The lattice structure is a logical one, based on inter-nodal communications paths. Obviously, in the physical world, it is impossible to create physical structures having more than three dimensions, but inter-nodal communications paths can be created in an arbitrary number of dimensions. It is not necessarily true that a given node's neighbors are physically the closest nodes to the given node, although it is generally desirable to arrange the nodes in such a manner, insofar as possible, as to provide physical proximity of neighbors.

In the preferred embodiment, the node lattice logically wraps to form a torus in all three coordinate directions, and thus has no boundary nodes. E.g., if the node lattice contains dimx nodes in the x-coordinate dimension ranging from 0 to (dimx−1), then the neighbors of Node((dimx−1), y0, z0) include Node((dimx−2), y0, z0) and Node (0, y0, z0), and similarly for the y-coordinate and z-coordinate dimensions. This is represented in FIG. 2 by links 202D, 202E, 202F which wrap around from a last node in an x, y and z dimension, respectively to a first, so that node 203, although it appears to be at a "corner" of the lattice, has six node-to-node links 202A-F. It will be understood that, although this arrangement is a preferred embodiment, a logical torus without boundary nodes is not necessarily a requirement of a lattice structure.

The aggregation of node-to-node communication links 202 is referred to herein as the torus network. The torus network permits each compute node to communicate results of data processing tasks to neighboring nodes for further processing in certain applications which successively process data in different nodes. However, it will be observed that the torus network contains only a limited number of links, and data flow is optimally supported when running generally parallel to the x, y or z coordinate dimensions, and when running to successive neighboring nodes. For this reason, applications requiring the use of a large number of nodes may subdivide computation tasks into blocks of logically adjacent nodes (communicator sets) in a manner to support a logical data flow, where the nodes within any block may execute a common application code function or sequence.

Figure 3A:
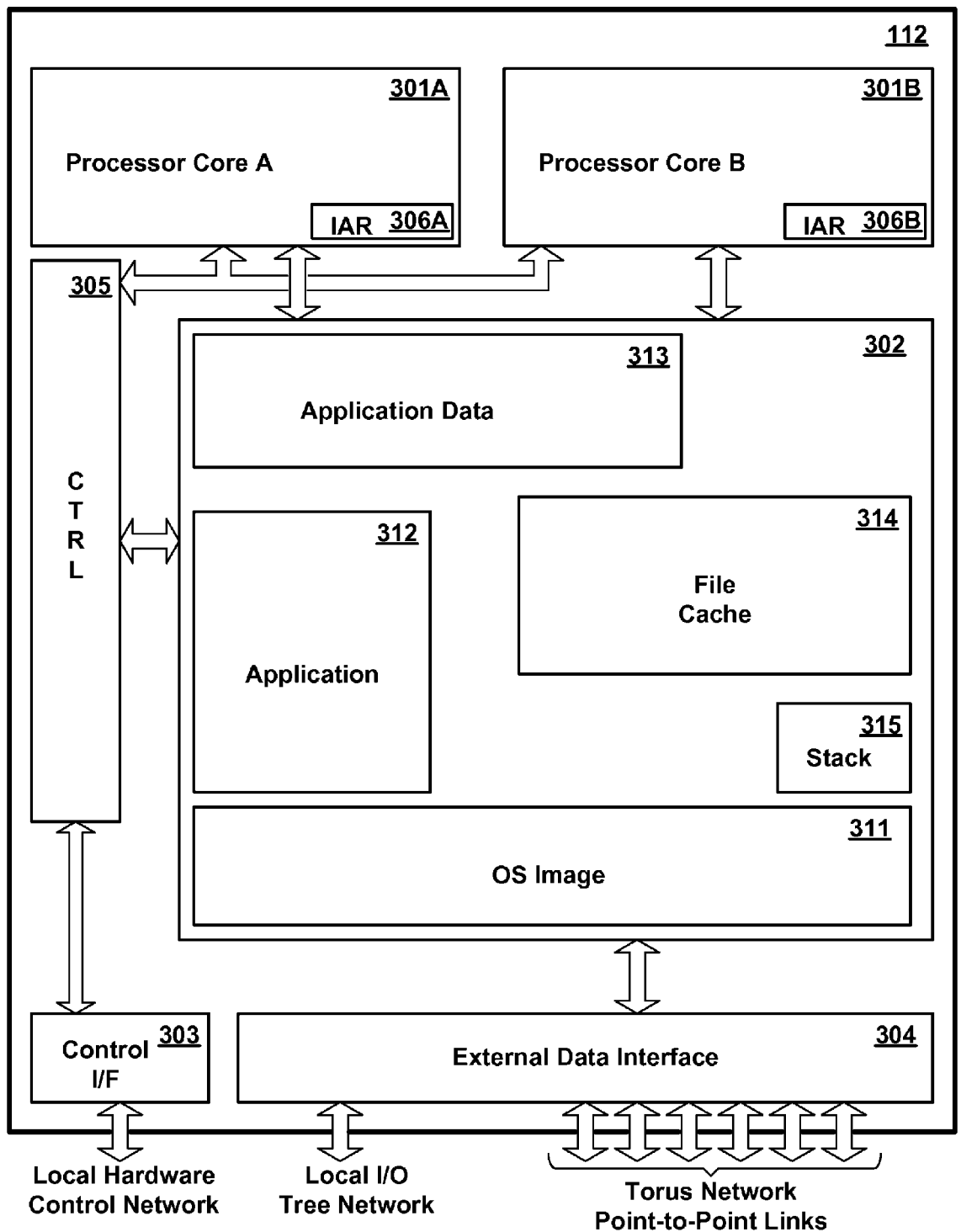
FIG. 3A is a high-level diagram of a compute node of the system of FIG. 1, configured according to a coprocessor operating mode, according to the preferred embodiment.
Figure 3B:
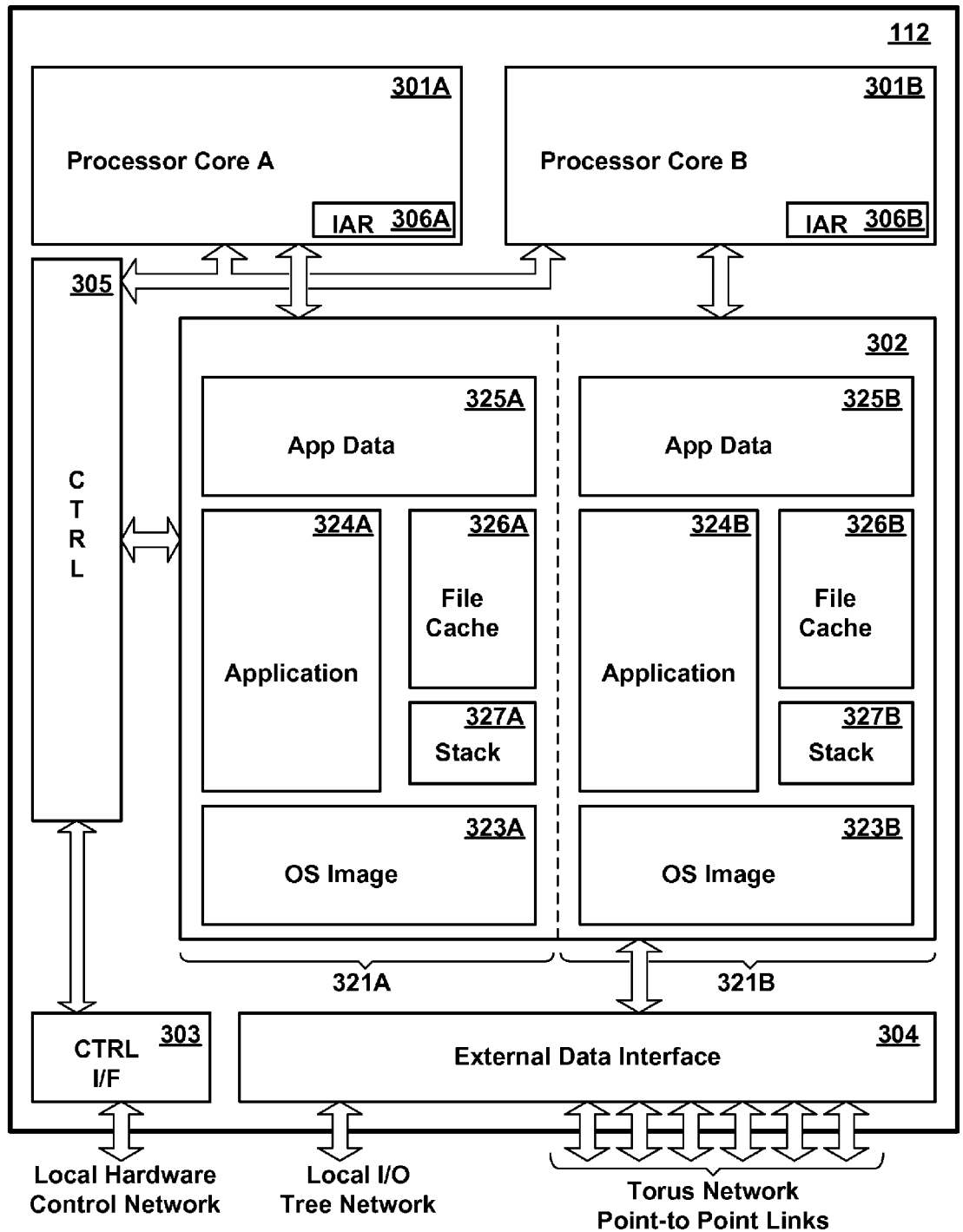
FIG. 3B is a high-level diagram of a compute node of the system of FIG. 1, configured according to a virtual node operating mode, according to the preferred embodiment.

FIGS. 3A and 3B are high-level block diagrams of the major hardware and software components of a compute node 112 of computer system 100 configured in different operating modes in accordance with the preferred embodiment, FIG. 3A representing a compute node configured according to a coprocessor operating mode, and FIG. 3B representing a compute node configured according to a virtual node operating mode. Compute node 112 comprises one or more processor cores 301A, 301B (herein generically referred to as feature 301), two processor cores being present in the preferred embodiment, it being understood that this number could vary. Compute node 112 further comprises a single addressable nodal memory 302 which is used by both processor cores 301; an external control interface 303 which is coupled to the corresponding local hardware control network 114; an external data communications interface 304 which is coupled to the corresponding local I/O tree network 113, and the corresponding six node-to-node links 202 of the torus network; and monitoring and control logic 305 which receives and responds to control commands received through external control interface 303. Monitoring and control logic 305 can access certain registers in processor cores 301 and locations in nodal memory 302 on behalf of control subsystem 102 to read or alter the state of node 112. In the preferred embodiment, each node 112 is physically implemented as a respective single, discrete integrated circuit chip.

From a hardware standpoint, each processor core 301 is an independent processing entity capable of maintaining state for and executing threads independently. Specifically, each processor core 301 contains its own instruction state register or instruction address register 306A, 306B (herein generically referred to as feature 306) which records a current instruction being executed, instruction sequencing logic, instruction decode logic, arithmetic logic unit or units, data registers, and various other components required for maintaining thread state and executing a thread.

Each compute node can operate in either coprocessor mode or virtual node mode, independently of the operating modes of the other compute nodes. When operating in coprocessor mode, the processor cores of a compute node do not execute independent threads. Processor Core A 301A acts as a primary processor for executing the user application sub-process assigned to its node, and instruction address register 306A will reflect the instruction state of that sub-process, while Processor Core B 301B acts as a secondary processor which handles certain operations (particularly communications related operations) on behalf of the primary processor. When operating in virtual node mode, each processor core executes its own user application sub-process independently and these instruction states are reflected in the two separate instruction address registers 306A, 306B, although these sub-processes may be, and usually are, separate sub-processes of a common user application. Because each node effectively functions as two virtual nodes, the two processor cores of the virtual node constitute a fourth dimension of the logical three-dimensional lattice 201. I.e., to specify a particular virtual node (a particular processor core and its associated subdivision of local memory), it is necessary to specify an x, y and z coordinate of the node (three dimensions), plus a virtual node (either A or B) within the node (the fourth dimension).

As described, functional network 105 services many I/O nodes, and each I/O node is shared by multiple compute nodes. It should be apparent that the I/O resources of massively parallel system 100 are relatively sparse in comparison with its computing resources. Although it is a general purpose computing machine, it is designed for maximum efficiency in applications which are compute intensive. If system 100 executes many applications requiring large numbers of I/O operations, the I/O resources will become a bottleneck to performance.

In order to minimize I/O operations and inter-nodal communications, the compute nodes are designed to operate with relatively little paging activity from storage. To accomplish this, each compute node contains its own complete copy of an operating system (operating system image) in nodal memory 302, and a copy of the application code being executed by the processor core. Unlike conventional multi-tasking system, only one software user application sub-process is active at any given time. As a result, there is no need for a relatively large virtual memory space (or multiple virtual memory spaces) which is translated to the much smaller physical or real memory of the system's hardware. The physical size of nodal memory limits the address space of the processor core.

As shown in FIG. 3A, when executing in coprocessor mode, the entire nodal memory 302 is available to the single software application being executed. The nodal memory contains an operating system image 311, an application code image 312, and user application data structures 313 as required. Some portion of nodal memory 302 may further be allocated as a file cache 314, i.e., a cache of data read from or to be written to an I/O file.

Operating system image 311 contains a complete copy of a simplified-function operating system. Operating system image 311 includes certain state data for maintaining process state. Operating system image 311 is preferably reduced to the minimal number of functions required to support operation of the compute node. Operating system image 311 does not need, and preferably does not contain, certain of the functions normally contained in a multi-tasking operating system for a general purpose computer system. For example, a typical multi-tasking operating system may contain functions to support multi-tasking, different I/O devices, error diagnostics and recovery, etc. Multi-tasking support is unnecessary because a compute node supports only a single task at a given time; many I/O functions are not required because they are handled by the I/O nodes 111; many error diagnostic and recovery functions are not required because that is handled by control subsystem 102 or front-end nodes 103, and so forth. In the preferred embodiment, operating system image 311 contains a simplified version of the Linux operating system, it being understood that other operating systems may be used, and further understood that it is not necessary that all nodes employ the same operating system.

Application code image 302 is preferably a copy of the application code being executed by compute node 112. Application code image may contain a complete copy of a computer program which is being executed by system 100, but where the program is very large and complex, it may be subdivided into portions which are executed by different respective compute nodes. Memory 302 further includes a call-return stack 315 for storing the states of procedures which must be returned to, which is shown separate from application code image 302, although in may be considered part of application code state data.

Referring to FIG. 3B, when executing in virtual node mode, nodal memory 302 is subdivided into a respective separate, discrete memory subdivision 321A, 321B (herein generically referred to as feature 321) for each processor core. These memory subdivisions are represented in FIG. 3B as contiguous regions of nodal memory, although it should be understood that they need not be contiguous.

In virtual node mode each subdivision 321 contains its own copy of operating system image 323A, 323B (herein generically referred to as feature 323). Like operating system image 311 used in coprocessor mode, operating system image 323 is an image of a reduced-function operating system, preferably a reduced-function Linux operating system. In the preferred embodiment all compute nodes use the same reduced function operating system, and the instruction code contained in the various operating system images 311, 323 is identical (although state data embedded in the image may, of course, vary). However, since system hardware is general and each compute node executes its instructions independently, it would conceivably be possible to employ different operating systems in different compute nodes, and even to employ different operating systems for different processor cores in the same compute node when operating in virtual node mode.

In virtual node mode, each subdivision 321 further contains its own copy of a respective application code image 324A, 324B (herein referred to generically as feature 324) as well as any application data structures 325A, 325B, file caches 326A, 326B and call-return stacks 327A, 327B (herein referred to generically as feature 327) required to support the user application sub-process being executed by the associated processor core. Since each node executes independently, and in virtual node mode, each co-processor has its own nodal memory subdivision 321 maintaining an independent state, application code images 324 within the same node may be different, not only in state data but in the executable code contained therein. Typically, in a massively parallel system, blocks of compute nodes are assigned to work on different user applications or different portions of a user application, and within a block all the compute nodes might be executing sub-processes which use a common application code instruction sequence. However, it is possible for every compute node 111 in system 100 to be executing the same instruction sequence, or for every compute node to be executing a different respective sequence using a different respective application code image.

In either coprocessor or virtual node operating mode, the entire addressable memory of each processor core 301 is contained in the local nodal memory 302. Unlike certain computer architectures such as so-called non-uniform memory access (NUMA) systems, there is no global address space among the different compute nodes, and no capability of a processor in one node to address a location in another node. When operating in coprocessor mode, the entire nodal memory 302 is accessible by each processor core 301 in the compute node. When operating in virtual node mode, a single compute node acts as two "virtual" nodes. This means that a processor core 301 may only access memory locations in its own discrete memory subdivision 321. In the representation of FIG. 3B, processor core 301A can access only memory locations in subdivision 321A, and processor core 301B can access only memory locations in subdivision 321B.

While a system having certain types of nodes and certain inter-nodal communications structures is shown in FIGS. 1 and 2, and a typical node having two processor cores and various other structures is shown in FIGS. 3A and 3B, it should be understood that FIGS. 1, 2, 3A and 3B are intended only as a simplified example of one possible configuration of a massively parallel system for illustrative purposes, that the number and types of possible devices in such a configuration may vary, and that the system often includes additional devices not shown. In particular, the number of dimensions in a logical matrix or lattice might vary; and a system might be designed having only a single processor for each node, with a number of processors greater than two, and/or without any capability to switch between a coprocessor mode and a virtual node mode. While various system components have been described and shown at a high level, it should be understood that a typical computer system contains many other components not shown, which are not essential to an understanding of the present invention. Furthermore, various software entities are represented conceptually in FIGS. 1, 3A and 3B as blocks or blocks within blocks of local memories 122 or 302. However, it will be understood that this representation is for illustrative purposes only, and that particular modules or data entities could be separate entities, or part of a common module or package of modules, and need not occupy contiguous addresses in local memory. Furthermore, although a certain number and type of software entities are shown in the conceptual representations of FIGS. 1, 3A and 3B, it will be understood that the actual number of such entities may vary and in particular, that in a complex computer system environment, the number and complexity of such entities is typically much larger.

In accordance with the preferred embodiment of the present invention, control subsystem 102 contains an analytical program or utility 123 for debugging and identifying errors occurring in the execution of an application by system 100. Analytical program 123 preferably contains an interactive user interface and multiple analytical or debug functions, among which is a function for identifying anomalous nodes in a communicator set, although the function for identifying anomalous nodes as described herein could alternatively be a stand-alone program or called function. The function for identifying anomalous nodes described herein is intended as but one of many tools available to the system administrator, developer or other user, to help isolate the cause of an error. It will not necessarily be useful for all types of errors, but for certain errors it will assist the user in identifying a cause. Although the analytical program is shown and described herein as resident in control subsystem 102, it could alternatively reside in a different system component such as a front end node 103, or even in a separate system attached to system 100 via a network (not shown).

The analytical program is typically invoked after an application has produced abnormal results. Abnormal results could be caused by either a hardware failure in system 100 or a defect in the application code. Some errors may manifest themselves in a large number of nodes concurrently, but other errors may be local in origin. For example, the failure of hardware within a single node or a single communication link between two nodes may appear as local anomalies. Due to the large number of nodes, it can be difficult to manually identify local anomalies.

In a typical application for a massively parallel computer system, it is expected that subsets of nodes will be devoted to common portions of the application and executing common code procedures, although each node of the subset will execute the common code procedures using independent state data. Typically, there is a data flow in the x, y and/or z coordinate direction through the nodes of such a subset, so that data is processed in successive nodes. Such a node subset is referred to as a communicator set. Due to the desired data flow between nodes, a communicator set normally has regular boundaries which form a logical rectangular parallelopiped in the three (or four) dimensional lattice 201 of compute nodes. The preferred embodiment of the present invention takes advantage of this property to identify possible communicator sets and nodes which appear to be missing from a communicator set. However, it will be understood that the analytical technique described herein is heuristic in nature, and is not guaranteed to correctly identify communicator sets in all cases, nor to correctly identify anomalous nodes in all cases.

Figures 4, 5:
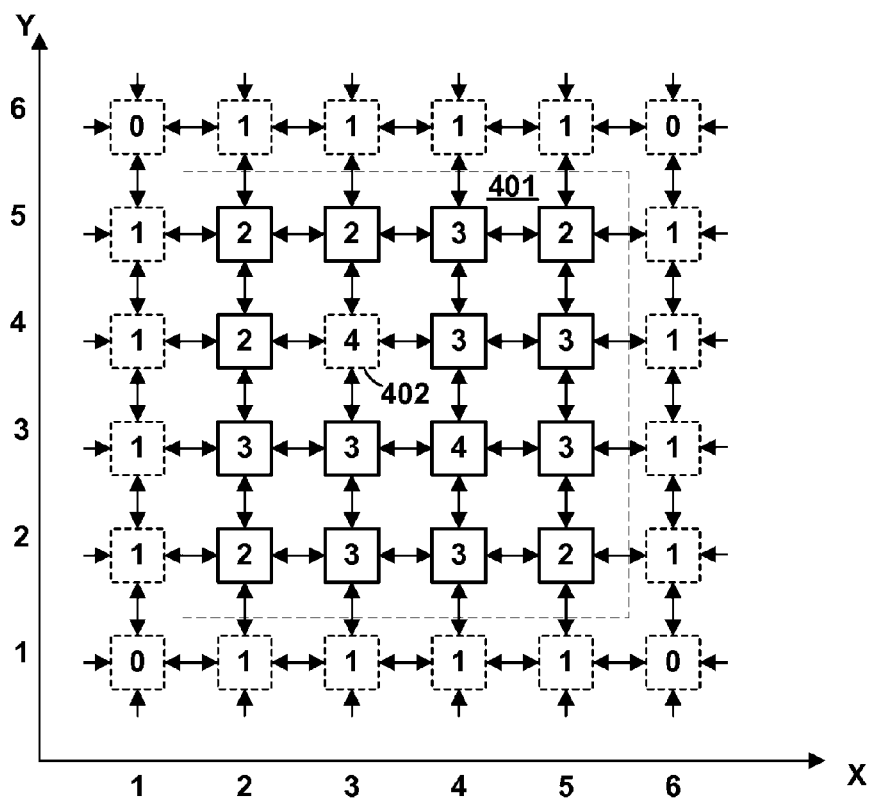
FIG. 4 is a conceptual example of a simplified communicator set of nodes containing a suspicious anomaly, according to the preferred embodiment.
FIG. 5 is a sorting of nodes in FIG. 4 according to number of neighbors and communicator set membership, according to the preferred embodiment.

FIG. 4 is a conceptual example of a simplified communicator set 401 containing a suspicious anomaly in the form of a "hole" in an otherwise regular sub-lattice of the lattice 201 of compute nodes. For clarity of illustration, FIG. 4 shows a two-dimensional lattice of nodes, it being understood that in accordance with the preferred embodiment the lattice might be in either three or four dimensions, and that the number of nodes in a typical communicator set is usually much greater. In determining the communicator set, all nodes having certain common state data are included in the communicator set. It is expected that the set so determined will have regular boundaries, i.e. be a rectangle in a two-dimensional lattice space. An anomalous node 402 has state data which differs from those of the other nodes of the set, and hence is not initially recognized as part of the communicator set by the analyzer. The analyzer therefore sees a communicator set having a "hole" in it at the location of the anomalous node 402. Such an anomalous node is indicative of some error condition either in the node itself or in the vicinity of the anomalous node. The analyzer considers each node having at least one neighbor in the communicator set determined by the analyzer (i.e., set 401, less node 402), and counts the number of such neighbors. In FIG. 4, the number within each node represents the number of neighbors of the node which are in the assumed communicator set, as determined by the analyzer. A node which is not itself in the communicator set determined by the analyzer, yet which has a large number of neighbors (i.e. is surrounded by nodes in the communicator set), is a suspicious anomaly, which probably belongs to the communicator set but is exhibiting some error state condition.

FIG. 5 is a sorting of nodes in FIG. 4 according to number of neighbors and communicator set membership. As shown in FIG. 5, if the nodes are presented to the user sorted by number of neighbors and communicator set membership, the anomalous node 402 bubbles to the top of the sorting for the immediate attention of the user.

Figure 6:
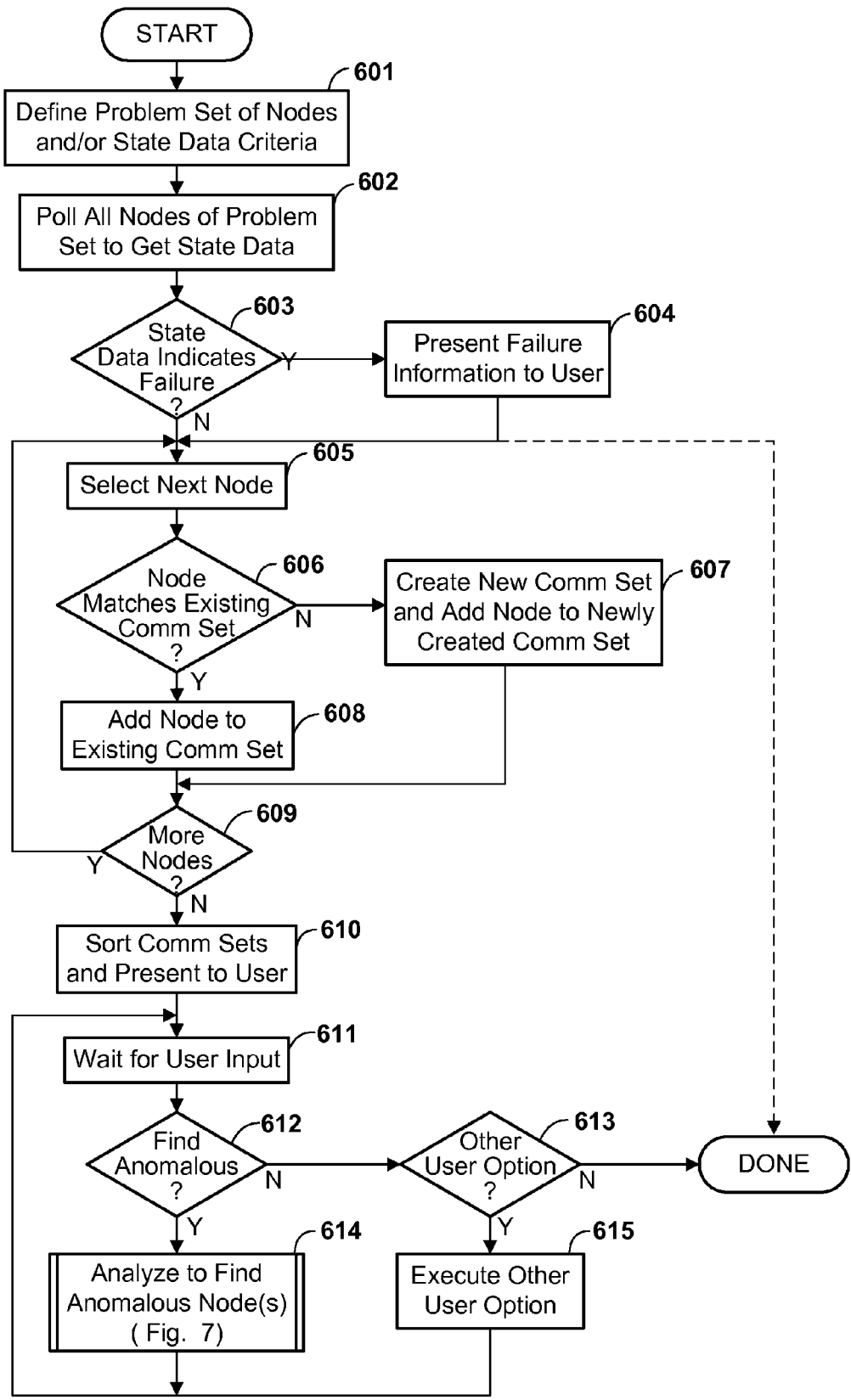
FIG. 6 is a high-level flow diagram showing the process of analyzing the state of various nodes of a massively parallel computer system, according to the preferred embodiment.

FIG. 6 is a high-level flow diagram showing the process of analyzing the state of various nodes of computer system 100, according to the preferred embodiment. Referring to FIG. 6, a user (who may be a system administrator, developer, or other user) invokes analyzer 123 and specifies the parameters of analysis. In particular, the user specifies a problem set of nodes to be analyzed, and optionally specifies state criteria to be used for analysis (step 601). Typically, the user is attempting to analyze the behavior of a particular application which recently executed (and perhaps concluded abnormally) on system 100. In such a case, the problem set will typically be the set of all compute nodes which were allocated to the application in question, and this set may be specified by identifying the application (i.e., without the user having to specify node-by-node). However, one could alternatively specify all nodes in system 100, or some arbitrary subset of nodes in system 100. The user may optionally specify other parameters of analysis, including in particular parameters to be used for grouping nodes in communicator sets and/or parameters to be used to identify node failure. In the preferred embodiment, communicator sets are defined by call-return stack traceback, i.e., the sequence of procedure calls recorded in the call-return stack (along with the currently executing procedure as identified by the instruction address register). Nodes having identical call-return stack tracebacks are grouped together, and are so described herein. However, other parameters could alternatively be defined, e.g., nodes for which some defined portion of the call-return stack is identical, or nodes having identical call histories based on trace data, or node groupings based on some state variable value or values.

Analyzer 123 invokes data collection utility 124 to poll the nodes within the previously defined problem set to obtain any required state data (step 602). Polling is preferably done by communicating with control logic 305 in the various compute nodes 112 using control system network 106, hardware controllers 108, local hardware control networks 114 and control interfaces 303. This method by-passes the functional network 105, and limits dependence on the state of the local operating systems 311, 323 in the compute nodes. One method for collecting state data is disclosed in commonly assigned copending U.S. patent application Ser. No. 11/425,778, filed Jun. 22, 2006, entitled "Method and Apparatus for Obtaining Stack Traceback Data for Multiple Computing Nodes of a Massively Parallel Computing System", which is herein incorporated by reference, although it should be understood that other methods could alternatively be used. Among the state information obtained are the current instruction addresses from instruction address registers 306 and the sequence of calling procedures recorded in call-return stacks 315, 327.

If the state data received from any particular node indicates a failure in that node, then the 'Y' branch is taken from step 603. A failure typically includes a situation in which the node is non-responsive, and hence no state data (or insufficient state data) is received. A failure could be defined to include other circumstances, e.g., a flag or flags maintained in certain state registers can be used to indicate error conditions. In any such case, information identifying the failing node and description of the failure is presented to the user (step 604). As used herein, "presented" means that data is communicated in any of various ways, such as display on an interactive display screen, transmission to another digital device over a network or other data communication link, saving of data to a file for later access, printing on a printer or other output device, etc. After presenting data to the user at step 604, the analyzer may either continue its analysis (as shown by the path to step 605) or exit (as shown by the dotted line path).

The analyzer then groups the nodes in one or more communicator sets, according to node state data, represented generally as steps 605-609. A next node is selected from the nodes of the problem set (step 605). If the selected node matches the nodes of any existing communicator set, the 'Y' branch is taken from step 606, and the node is added to the existing communicator set which it matched (step 608). If the node does not match the nodes of any existing communicator set, the 'N' branch is taken from step 606, and a new communicator set is created with the selected node as its initial member (step 607). If more nodes remain in the problem set, the 'Y' branch is taken from step 609 to select a next node. When all nodes have been thus analyzed, the 'N' branch is taken from step 609.

"Matching" means that certain pre-defined state data in the selected node matches that of the other nodes of the set. As explained above, in the preferred embodiment the predefined state data is the call-return stack traceback of the application sub-process executing within the node. This call-return stack traceback is determined from the contents of the instruction address register 306 (which indicates the current procedure being executed), and the call-return stack 315, 327 (which indicates previously called procedures which have not yet been returned to). Only the sequence of procedure calls must match; it is not necessary that other state data saved on the call-return stack be identical for all nodes of the communicator set, as this will rarely be the case.

After identifying the various communicator sets, the analyzer presents the data to the user (step 610). Preferably, this involves displaying, on an interactive display, the call-return stack traceback of each communicator set and the number of nodes in each set. Other and/or additional information could alternatively be displayed, and the user may be allowed to make any of various selections to display different data or data organized in a different format. The analyzer therefore waits for a user input after presenting the communicator sets to the user (step 611).

At this point, one of the options available to the user is to find nodes which appear to be missing from the determined communicator set. These are nodes which appear to belong to the determined communicator set based on their coordinate location within the lattice, but which are not part of the determined communicator set because their state data does not match the other nodes of the communicator set. These nodes are referred to herein as anomalous nodes.

As illustrated in FIG. 6, when a user input is received at step 611, if the input is a command to find anomalous nodes, the 'Y' branch is taken from step 612 and the analyzer performs an analysis of lattice location to detect anomalies. This analytical step is represented in FIG. 6 as step 614, and is illustrated in greater detail in FIG. 7. If the user selects some other option (the 'Y' branch from step 613), the analyzer executes the selected other option (step 615). In either case, the analyzer then returns to step 611 to await further user input. The user may also exit the analyzer, shown as the 'N' branch from step 613.

Figure 7:
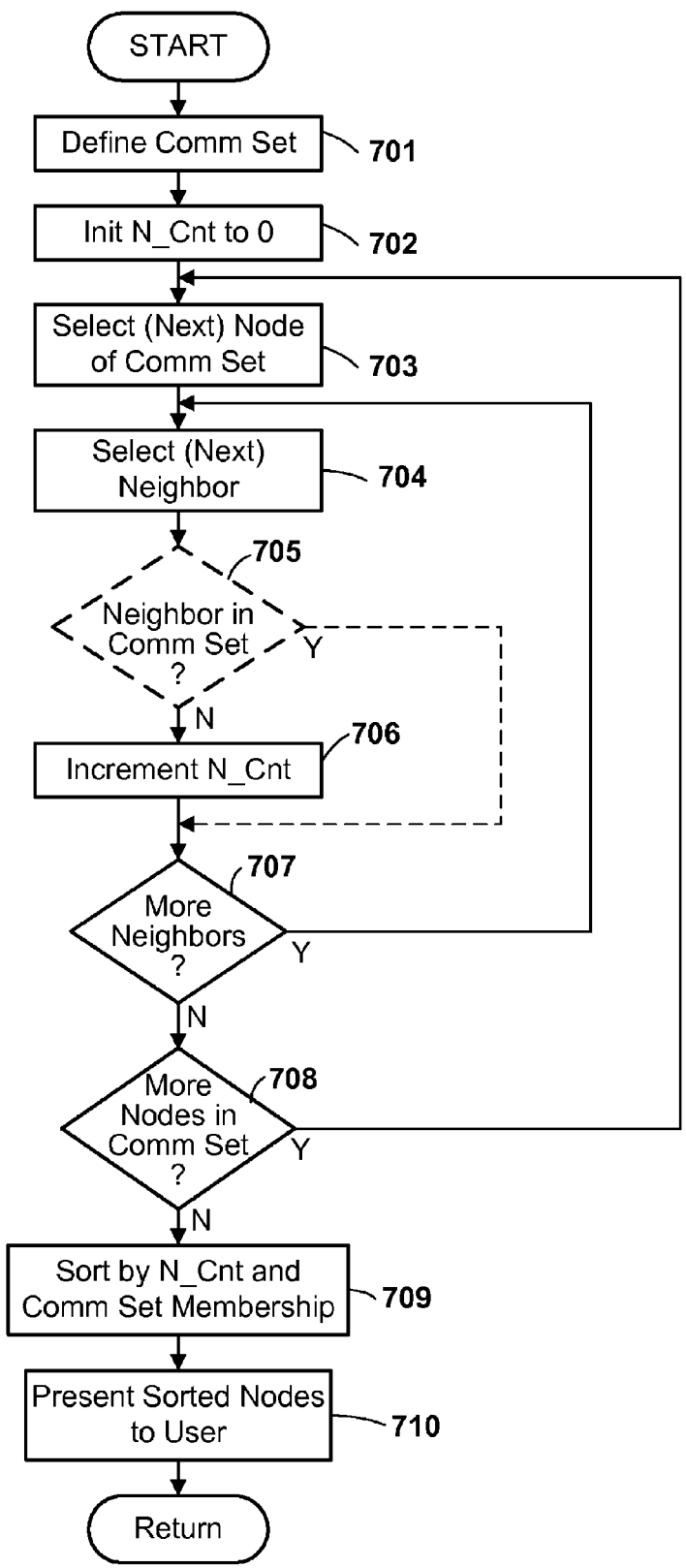
FIG. 7 is a flow diagram showing in greater detail the process of identifying a suspicious anomaly within a communicator set, according to the preferred embodiment.

FIG. 7 is a flow diagram showing in greater detail the process of identifying a suspicious anomaly or "hole" within a communicator set sub-lattice, according to the preferred embodiment. Referring to FIG. 7, the analyzer receives a user selection of a communicator set to be analyzed when the user invokes the function to find anomalous nodes (step 701). Preferably, the user specifies a communicator set as previously determined by the analyzer and described above with respect to FIG. 6, but the analyzer could alternatively allow the user to define the communicator set for analysis as a union of multiple previously determined communicator sets, or in some other manner. The analyzer initializes any required data structures, and in particular initializes a respective neighbor count (N_Cnt) associated with each node to zero (step 702).

The analyzer then selects a next node from the communicator set to be analyzed (step 703). With respect to the selected node, the analyzer selects a next neighbor of the selected node (step 704). Note that in the three-dimensional lattice of the preferred embodiment, each node has six neighbors. In the four-dimensional lattice (i.e., when operating in virtual node mode), each virtual node has the six neighbors of the physically different neighboring nodes, plus the virtual node neighbor within its own physical node, for a total of seven neighbors. The number of neighbors may vary depending on the lattice structure.

Depending on the implementation or option selected by the user, the analyzer may produce a list of all nodes which have any neighbors in the communicator set, or only of nodes which have neighbors in the communicator set, but are not themselves in the communicator set. In the latter case (represented by optional step 705), and if the selected neighbor is itself in the communicator set, then the 'Y' branch is taken from step 705 to step 707, by-passing step 706. In other cases, the N_Cnt of the selected neighbor is incremented by one (step 706). If there are any more neighbors of the selected node, the 'Y' branch is taken from step 707 to select a next neighbor at step 704. When all neighbors of the selected node have been considered, the 'N' branch is taken from step 707.

If any more nodes of the communicator set remain to be evaluated, the 'Y' branch is taken from step 708 and a next node is selected at step 703. When all nodes have been thus considered, the 'N' branch is taken from step 708.

The analyzer then sorts the nodes in order of N_Cnt and communicator set membership (step 709). I.e., nodes having the highest N_Cnt are at the head of the sorting, and among nodes having the same N_Cnt, nodes which are not in the communicator set are ahead of those which are. The sorted list of nodes is then presented to the user (step 710).

The data produced by analyzing node neighbors can be presented using different sortings or filters. As explained above, it is possible to present only those nodes which are not themselves in the communicator set. Alternatively, it would be possible to present, in an emphasized or highlighted fashion, those nodes which are in the communicator set but which have an unusually low number of neighbors, e.g. none, as this circumstance can also be considered an anomaly (although perhaps a less common one). Preferably, nodes which have an N_Cnt of zero, and which are not themselves in the communicator set, are filtered out of the presented list, since these are of little interest.

A particular method or algorithm for analyzing and presenting data to the user is described herein as a preferred embodiment along with certain variants. It will be understood that various alternative algorithms could be used within the scope of the present invention, of which the following are a few examples, it being understood that these alternatives are described as illustrative examples, and not by way of limitation on the scope of alternatives possible.

In the preferred embodiment, nodes are automatically grouped in presumed communicator sets by comparing state data, and in particular call-return stack traceback, of the nodes. However, there may be various alternative methods for establishing the initial grouping of a communicator set. As explained earlier, alternative state data could be used as a basis for comparison and matching of nodes, such as the contents of certain data structures. As an additional alternative, grouping of nodes into communicator sets might be performed on the basis of some output received from the nodes during execution of the application. There may be other methods for defining the communicator set to be analyzed.

In the preferred embodiment, suspicious anomalies are presented to the user by sorting the nodes according to number of neighbors and communicator set membership. Such a sorting will typically cause the suspicious nodes to be displayed at the head of the list, which calls the nodes to the attention of the user and is a form of highlighting these nodes. However, the anomalous nodes could be communicated in some other form. For example, a filter could present only nodes, if any, having a minimum number of neighbors and which are not members of the communicator set. Such a number could be determined as an absolute threshold or by comparison to other nodes, so that only nodes which stick out from their fellows are presented. Any of various alternative methods could be used for communicating the fact that a certain node or nodes is anomalous.

In general, the routines executed to implement the illustrated embodiments of the invention, whether implemented as part of an operating system or a specific application, program, object, module or sequence of instructions, are referred to herein as "programs" or "computer programs". The programs typically comprise instructions which, when read and executed by one or more processors in the devices or systems in a computer system consistent with the invention, cause those devices or systems to perform the steps necessary to execute steps or generate elements embodying the various aspects of the present invention. Moreover, while the invention has and hereinafter will be described in the context of fully functioning computer systems, the various embodiments of the invention are capable of being distributed as a program product in a variety of forms, and the invention applies equally regardless of the particular type of computer-readable signal-bearing media used to actually carry out the distribution. Examples of signal-bearing media include, but are not limited to, volatile and non-volatile memory devices, floppy disks, hard-disk drives, CD-ROM's, DVD's, magnetic tape, and so forth. Furthermore, the invention applies to any form of signal-bearing media regardless of whether data is exchanged from one form of signal-bearing media to another over a transmission network. Examples of signal-bearing media are illustrated in FIG. 1 as memory 122 and storage devices 109A, 109B, 125, and in FIGS. 3A and 3B as memory 302.

Although a specific embodiment of the invention has been disclosed along with certain alternatives, it will be recognized by those skilled in the art that additional variations in form and detail may be made within the scope of the following claims:

What is claimed is:

1. A computer-implemented method for analyzing errors in a parallel computer system, said parallel computer system comprising multiple nodes arranged in a lattice for inter-nodal communications, each node comprising at least one processor for executing a respective application sub-process and a nodal memory, said method comprising the steps of:
    executing a respective unique application sub-process of a common application in each node of a plurality of said nodes of said parallel computer system to produce respective independent state data in each node of said plurality of said nodes;
    obtaining said respective independent state data corresponding to each node of said plurality of nodes of said parallel computer system;
    analyzing said independent state data to identify a first node having anomalous corresponding independent state data with respect to respective independent state data corresponding to a plurality of neighboring nodes of said first node, each said neighboring node being a node adjacent said first node within said lattice, wherein said step of analyzing said independent state data to identify a first node comprises:
        identifying a first subset of said plurality of nodes, said first subset consisting of all nodes having independent state data which matches according to a pre-defined matching criterion; and
        using the topology of said lattice to identify said first node as an anomalous neighbor of at least one node of said first subset; and
    presenting results of said analyzing step to a user.

2. The method for analyzing errors of claim 1, wherein said respective independent state data comprises a respective call-return stack traceback for each of said plurality of nodes.

3. The method for analyzing errors of claim 2, wherein said step of analyzing said independent state data comprises identifying a plurality of discrete subsets of said plurality of nodes for which corresponding respective independent state data was obtained by said step of obtaining respective independent state data, each subset comprising one or more nodes having matching call-return stack tracebacks according to said pre-defined matching criterion.

4. The method for analyzing errors of claim 3, wherein said step of analyzing said independent state data further comprises determining, with respect to each respective node of a plurality of nodes, a number of neighbors of the respective node which are members of said first subset, said first subset being one of said plurality of discrete subsets; and
    identifying said first node according to said number of neighbors and membership in said first subset.

5. The method for analyzing errors of claim 1, wherein said step of using the topology of said lattice to identify said first node as an anomalous neighbor of at least one node of said first subset comprises:
    determining, with respect to each of a plurality of nodes, a number of neighbors of the respective node which are members of said first subset; and
    identifying said first node according to said number of neighbors.

6. The method for analyzing errors of claim 1, wherein said step of analyzing said independent state data to identify a first node comprises:
    for each respective node of a second subset of said plurality of nodes, identifying a number of neighbors of the respective node which are members of said first subset of said plurality of nodes.

7. The method for analyzing errors of claim 6,
    wherein said step of analyzing said independent state data to identify a first node further comprises sorting said nodes of said second subset according to the respective number of neighbors of each node of said second subset which are members of said first subset; and
    wherein said step of presenting results of said analyzing step to a user comprises presenting said second subset of nodes in order of said sorting.

8. A program product for analyzing errors in a parallel computer system, said parallel computer system comprising multiple nodes arranged in a lattice for inter-nodal communications, each node comprising at least one processor for executing a respective application sub-process and a nodal memory, the program product comprising:
    a plurality of computer executable instructions recorded on tangible computer-readable storage media, wherein said instructions, when executed by at least one computer system, cause the at least one computer system to perform the steps of:
    receiving respective independent state data corresponding to each of a plurality of said nodes, said respective independent state data being produced as a result of executing a respective unique application sub-process of a common application in each node of said plurality of nodes of said parallel computing lattice;
    analyzing said independent state data to identify a first node of said plurality of said nodes having anomalous corresponding independent state data with respect to respective independent state data corresponding to a plurality of neighboring nodes of said first node, each said neighboring node being a node adjacent said first node within said lattice, wherein said analyzing said independent state data to identify a first node comprises:
        identifying a first subset of said plurality of nodes using said state data, said first subset consisting of all nodes having respective independent state data which matches according to a pre-defined matching criterion; and
        using the topology of said lattice to identify said first node as an anomalous neighbor of at least one node of said first subset; and
    presenting results of said analyzing step to a user.

9. The computer program product of claim 8, wherein said respective independent state data comprises a respective call-return stack traceback for each of said plurality of nodes.

10. The computer program product of claim 8,
wherein said step of analyzing said independent state data to identify a first node of said plurality of nodes comprises sorting said nodes of said plurality of nodes according to the respective number of neighbors of each node which are members of said first subset; and
wherein said step of presenting results of said analyzing step to a user comprises presenting said first nodes for which a number of neighbors was determined in order of said sorting.

11. A computer system which analyzes errors in a parallel computing lattice, said lattice comprising a plurality of nodes coupled by inter-nodal communications paths, each node comprising at least one processor for executing a respective application sub-process and a nodal memory, the computer system comprising:
at least one processor;
a memory for storing data addressable by said at least one processor;
an analytical program embodied as computer executable instructions storable in said memory and executable on said at least one processor, said analytical program comprising:
(a) a state data function which receives respective independent state data corresponding to each of a plurality of nodes of said parallel computing lattice, said respective independent state data being produced as a result of executing a respective unique application sub-process of a common application in each node of said plurality of nodes of said parallel computing lattice;
(b) an anomaly detector function which identifies a first node having anomalous corresponding independent state data with respect to respective independent state data corresponding to a plurality of neighboring nodes of said first node, each said neighboring node being a node adjacent said first node within said lattice, wherein said anomaly detector function identifies a first subset of said plurality of nodes, said first subset consisting of all nodes having state data which matches according to a pre-defined matching criterion, and wherein said anomaly detector function uses the topology of said lattice to identify said first node as an anomalous neighbor of at least one node of said first subset; and
(c) an output function which presents results of said state data and anomaly detector functions to a user.

12. The computer system of claim 11, wherein said computer system is a massively parallel computer system which includes said parallel computing lattice.

13. The computer system of claim 12, wherein said computer system comprises a control subsystem separate from said parallel computing lattice, said control subsystem including at least one processor, a memory for storing data addressable by said at least one processor, and said analytical program.

14. The computer system of claim 11, wherein said respective independent state data comprises a respective call-return stack traceback for each of said plurality of nodes.

15. The computer system of claim 14, wherein said anomaly detector function identifies a plurality of discrete subsets of said plurality of nodes for which corresponding respective independent state data was received by said state data function, each subset comprising one or more nodes having matching call-return stack tracebacks according to said pre-defined matching criterion.

16. The computer system of claim 11, wherein said anomaly detector function identifies said first node as an anomalous node by determining, with respect to each of a plurality of nodes, a number of neighbors of the respective node which are members of said first subset, and identifying said first node according to said number of neighbors.

17. The computer system of claim 11, wherein said anomaly detector function determines, for each respective node of a second subset of said plurality of nodes, a number of neighbors of the respective node which are members of said first subset of said plurality of nodes.

* * * * *